United States Patent [19]

Borcherding et al.

[11] Patent Number: 4,931,682
[45] Date of Patent: Jun. 5, 1990

[54] SHIMLESS/GROUNDLESS DYNAMOELECTRIC MACHINE

[75] Inventors: Gary W. Borcherding, Florissant; John G. Lewis, St. Louis County, both of Mo.

[73] Assignee: Emerson Electric Co., St. Louis, Mo.

[21] Appl. No.: 255,757

[22] Filed: Oct. 7, 1988

[51] Int. Cl.$^5$ ............................................. H02K 5/08
[52] U.S. Cl. ........................................ 310/89; 310/43; 310/50; 411/372
[58] Field of Search ................... 310/50, 43, 83, 88, 310/89, 90; 411/372, 373, 375, 431

[56] References Cited

U.S. PATENT DOCUMENTS

| | | | |
|---|---|---|---|
| 1,822,859 | 9/1931 | Perkins | 310/43 X |
| 2,795,144 | 6/1957 | Morse | 411/431 |
| 3,786,290 | 1/1974 | Papst et al. | 310/67 |
| 3,873,863 | 3/1975 | Pew | 310/50 |
| 3,875,436 | 4/1975 | MacFarland | 310/50 |
| 3,942,054 | 3/1976 | Kristen et al. | 310/254 |
| 3,992,778 | 11/1976 | Urbush | 310/47 |
| 4,420,702 | 12/1983 | Mixner | 310/254 |

FOREIGN PATENT DOCUMENTS

| | | | |
|---|---|---|---|
| 1908656 | 9/1970 | Fed. Rep. of Germany | 310/89 |
| 2809390 | 9/1979 | Fed. Rep. of Germany | 310/83 |
| 916162 | 1/1963 | United Kingdom | 411/375 |

Primary Examiner—Patrick R. Salce
Assistant Examiner—D. L. Rebsch
Attorney, Agent, or Firm—Polster, Polster and Lucchesi

[57] ABSTRACT

A dynamoelectric machine includes a stator assembly and a rotor assembly, including a rotatable shaft ad a rotor affixed to and rotatable with the shaft. The stator and rotor assemblies are assembled into a motor and the motor has the stator and rotor insulated from electrical contact with other objects. Because of its construction and design, the motor does not require electrical grounding prior to use so that it is not a hazard to persons coming into contact with it in its application.

5 Claims, 1 Drawing Sheet

SHIMLESS/GROUNDLESS DYNAMOELECTRIC MACHINE

BACKGROUND OF THE INVENTION

This invention relates to dynamoelectric machines and more particularly, to an electric motor whose stator and rotor assemblies are insulated from electrical contact with outside objects so that the motor does not require additional electrical grounding prior to use.

Conventional dynamoelectric machines, such as electric motors, are fabricated by assembling various stator and rotor elements. Generally the stator and rotor assemblies are placed in a metal housing or shell closed by endshields. In the past, various construction techniques have been employed for constructing motors used in domestic appliances, for example dishwashers and washing machines. In the attempt to lower production costs, glue together motor constructions have proved successful over the years. These techniques, however, do not easily lend themselves to automated motor production. For example, shims are usually required during assembly of the various stator and rotor components to ensure a uniform air gap is provided for motor operation. This is particularly disadvantageous because the insertion and removal of the shims are done by hand.

In addition, appliance motors generally require an external ground wire or ground lead so the motor can be grounded in applicational use. The ground attachment generally is made after the motor is mounted or attached to another metal structure in the appliance. The mating surface of that structure also must be machined so that the motor can be properly attached in applicational use. This can be a time consuming operation, particularly where the motor is being assembled to the structure as part of an ongoing manufacturing operation.

The invention disclosed hereinafter decreases these prior art difficulties with a construction that is low in cost and easily automated. Constructional details are contained in copending U.S. Patent Application Ser. Nos. 07/255,756 by Baker, 07/255,755 by Borcherding, 07/255,758 by Borcherding et al, 07/255,707 by Ottersbach, 07/255,727 by Hildebrandt et al, 07/255,706 by Borcherding et al, and 07/255,838 by Borcherding, which are assigned to the assignee of the present application, the disclosures of which are intended to be incorporated herein by reference.

SUMMARY OF THE INVENTION

Among the several objects of the present invention may be noted the provision of an improvement for assembling stator and rotor components into a motor so the assemblies, when the motor is completed, are insulated from hazardous contact with other elements; the provision of such an improvement in which the motor does not require electrical grounding prior to use; the provision of such an improvement to provide a uniform air gap between the stator and rotor assemblies when they are installed into the motor without the use of shims; the provision of such an improvement to eliminate the need for preparing metal structures, for example, both to the motor endshield or to the surface to which the motor is mounted, prior to mounting the motor; the provision of such a motor whose assembly is easily automated; and, the provision of such an improvement in which assembly of the motor into other structures is readily accomplished.

In accordance with this invention, generally stated, a dynamoelectric machine comprises a stator assembly and a rotor assembly including a rotatable shaft and a rotor affixed to and rotatable with the shaft. An improvement comprises means for assembling the stator and rotor assemblies into a motor. The motor, when assembled in the application, insulates the stator and rotor assemblies from hazardous contact with other surfaces. The motor does not require electrical grounding prior to use.

Other objects and features will be in part apparent and in part pointed out hereinafter.

BRIEF DESCRIPTION OF THE DRAWINGS

In the drawings.

Corresponding reference characters indicate corresponding parts throughout the various views of the drawings.

DESCRIPTION OF THE PREFERRED EMBODIMENT

Figure 1:
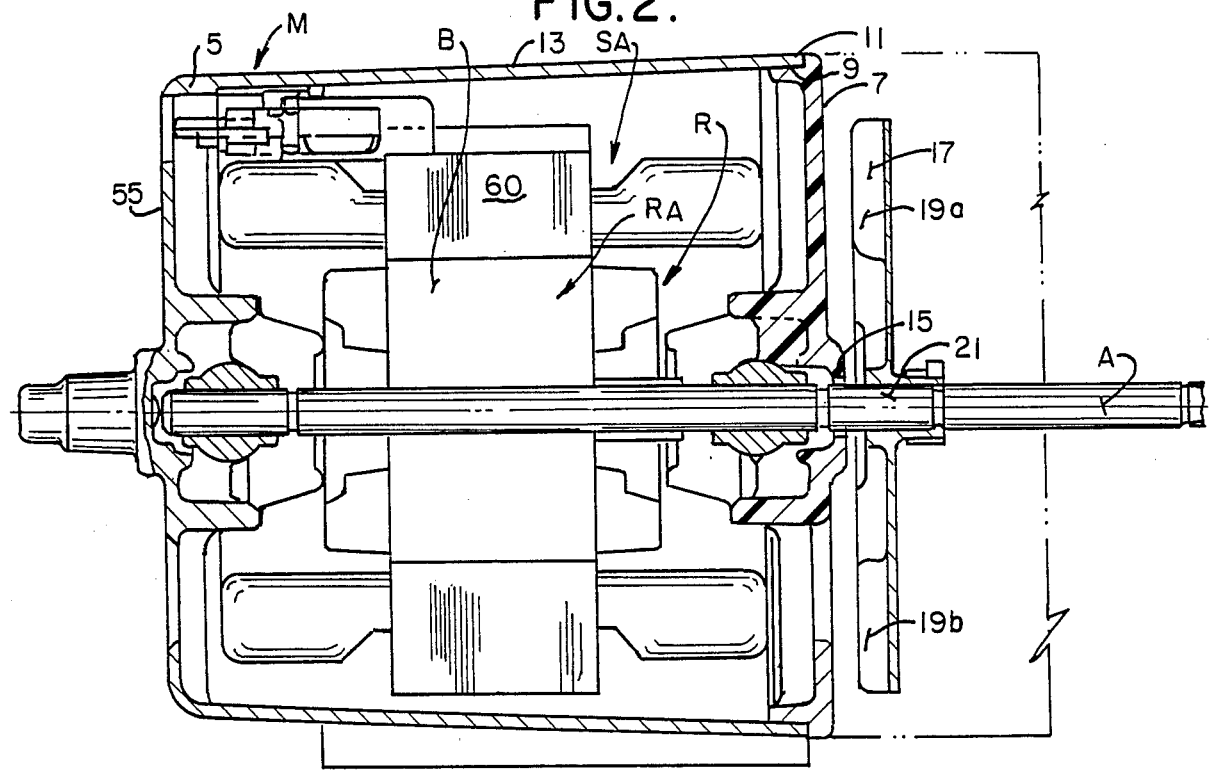
FIG. 1 is a cross sectional view of an electric motor illustrating the improvement of the present invention.

A dynamoelectric machine such as an electric motor M, is shown in FIG. 1, and includes a stator assembly SA. The motor further includes a rotor assembly RA that includes a rotary shaft A and a rotor B affixed to and rotatable with the shaft.

Figure 2:
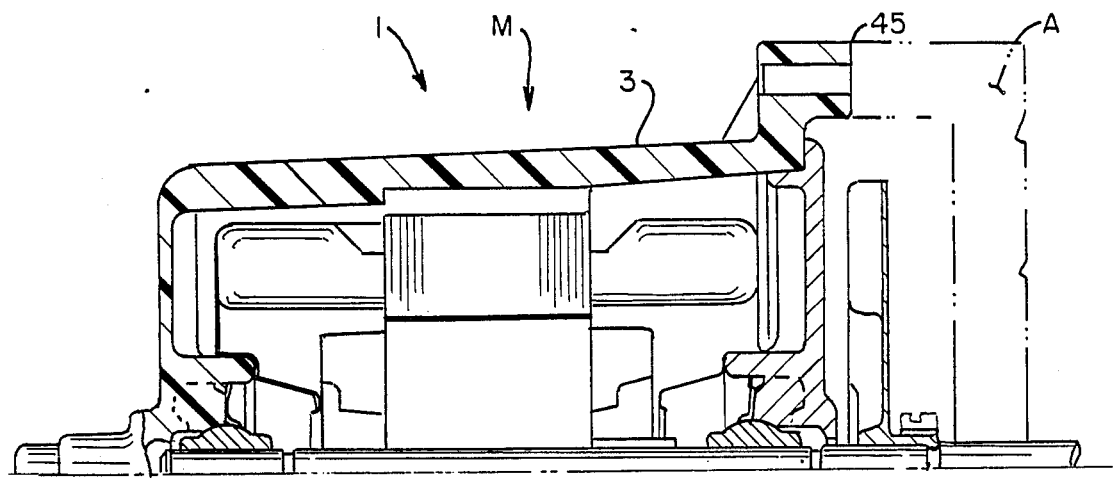
FIG. 2 is a partial sectional view of the motor illustrating the mating of the motor to another structure.

An improvement of the present invention is indicated generally 1 in the drawings and comprises means for assembling the stator and rotor assemblies into an electric motor. Means 1 comprises a housing or shell 3 formed of an electrically non-conductive material in which the stator and rotor assemblies are housed. In the embodiment of FIG. 1, housing 3 includes a hollow cylindrically shaped structure 5 which is closed at one end by the endshield 55. In the embodiment of FIGS. 1 and 2, the endshield 55 is integrally formed with the shell 3. Shell 3 may be formed in any suitable manner as, for example, by injection molding of a synthetic resin material such as an electrically non-conductive polyester material. Various mounting and aligning surfaces may be formed on the interior of housing 3 to facilitate the automated assembly of the components comprising the stator and rotor assemblies and the other elements comprising the motor.

Means 1 also includes the separable endshield 7 which is also formed of an electrically non-conductive material, preferably, the same type of electrically non-conductive polyester material of which housing 3 is formed. Endshield 7 is attachable to the open end of housing 3, after the stator and rotor assemblies SA and RA respectively, are placed therein. Endshield 7 has a circumferential inwardly projecting pilot 9. The pilot 9 is spaced inwardly from a perimeter 11 of the shield 7 a sufficient distance to permit interconnection of the parts. This permits the endshield 7 to be automatically assembled to the open end of housing 3 and secured to the housing by an appropriate method, so to form a completed housing assembly.

Endshield 7 has a central opening 15 through which one end of shaft A projects. Means 1 further comprises a multi-bladed fan 17 formed of an electrically non-conductive material and attachable to the shaft. As shown in the drawings, fan 17 includes a plurality of blades, representative ones of which are represented by the numerals 19A and 19B, and a hub 21 which fits over shaft A to install the fan on the shaft. If shaft A is a non-stepped shaft as shown in the drawings, fan 17 is preferably secured to the shaft in accordance with the teachings of copending U.S. Patent Application Ser. No. 07/255,838, which is assigned to the same assignee as the present application and which is incorporated herein by reference.

By providing a housing, endshield or shields and fan of an electrically non-conductive material, motor M can be readily assembled such that the electrically "live" components, such as the stator and rotor assemblies, are insulated from hazardous contact with other objects. This permits the motor to meet all requirements such as established by agencies such as Underwriters Laboratory. Further, this eliminates the need for motor grounding provisions such as external motor leads, wires, or ground screws by both the manufacturer of the motor and the motor end user.

Figure 3:
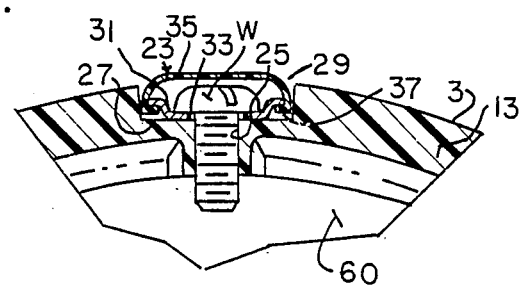
FIG. 3 is a partial sectional view of the motor housing illustrating a non-conductive overcap system used to cover a screw head employed in the motor of this invention; and, FIG. 4 is a partial sectional view illustrating installation of a pin to secure a stator core.

To further enhance the insulative capability of motor M, two additional features are provided. First, metallic screws W such as that shown in FIG. 3 are used to secure the core of stator S to motor housing 3. Since the stator core can become electrically "live", the screws W can also become "live", or electrically conductive. To prevent contact between the head of screw W and external objects, an insulative overcap system 23 is fitted over the head of the screw.

Screw W is threaded into the stator assembly SA along a stator core 60 through an opening 25 in a base 27 of a recess 29 in an outer wall 13 of the housing 3. The overcap system 23 has a base section 31 which is secured in place between the bottom of the head of the screw W and base 27 of the recess. Section 31 has a slightly larger diameter than the head of screw W. Base section 31 also has a central opening 33 formed in it, which clears the diameter of screw W. The overcap system also includes a rounded cap section 35 which encloses the head of screw W. As shown in FIG. 3, the lower end of cap section 35 has an inward-turned circumferential flange 37 that snaps over and locks to the outer margin of base section 31. That is, the outer margin of base section 31 is turned upwardly to rest on the flange 37. The round cap 35 is formed of an electrically non-conductive synthetic resin plastic material, which acts to prevent electrical contact between the screw W and objects external to motor M.

Figure 4:
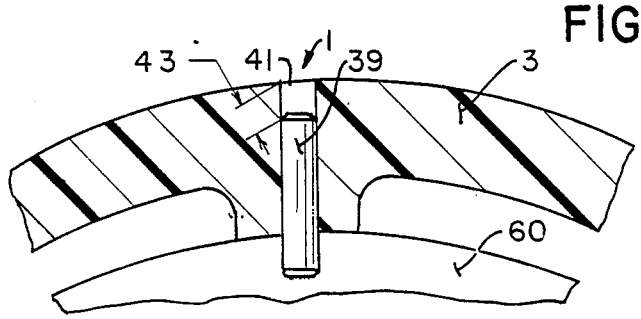

Referring now to FIG. 4, it may be observed that a metallic pin 39 may be used in place of screw W. If the pin 39 is used, it is inserted through a pre-drilled hole 41 in housing 3 into the stator core 60. As with the screw W, pin 39 secures the stator core from both axial and torsional movement. To prevent electrical contact between the pin and external objects, the pin is driven sufficiently deep into the hole that an adequate gap 43 exists between the top of the pin and the outer surface of the housing to effectively isolate the pin from contact.

At the same time, fabrication of motor M can be made more efficient. The interior design of housing H can be made such that an adequate, generally uniform air gap is created between the rotor assembly and the stator assembly so that shims are no longer required to achieve air gap during motor construction. This speeds motor assembly and facilitates the automated assembly of the motor. Also, the exterior surface of the housing H is such as to allow the motor M to be readily mated with customer components without additional preparation for mating surfaces as, for example, when the motor is to be installed in a household appliance. Since external grounding is no longer required with motor M, there is no need to prepare a mating surface, such as surface 45 shown in FIG. 2 in any special way. Rather, the motor M may be mounted directly to an appliance, indicated generally as A. In an assembly line operation, this facilitates assembly of the appliance while at the same time there is assurance that the end user of the appliance will be safe from electrical shock should a malfunction in electrical operation occur.

Numerous variations, within the scope of the appended claims, will be apparent to those skilled in the art in light of the preceding description and accompanying drawings. Thus, the materials used for various component parts may be changed. For example, other insulative materials for the shield 3 may be utilized. Likewise, the design shape of the motor may be altered. As indicated, the end wall or endshield 55 may be formed separately and later attached to the shell 13, even though integral construction of those parts is illustrated. One particular application in which the motor M is used requires use of the fan 17. The fan 17 may be eliminated in other applications. These variations are merely illustrative.

Having thus described the invention, what is claimed and desired to be secured by Letters Patent is:

1. In a dynamoelectric machine including a stator assembly, and a rotor assembly including a shaft mounted for rotation with respect to the stator assembly, and a rotor affixed to and rotatable with the shaft, the improvement comprising means for assembling the stator and rotor assemblies into a motor, said motor when assembled, insulating the stator and rotor assemblies from electrical contact with other objects whereby the motor does not require electrical grounding when installed in an intended application, the assembly means comprising a shell formed of an electrically non-conductive material in which the stator and rotor assemblies are placed, the shell defining a cavity having first and second ends, and means for closing said first and second ends including means for rotatably supporting said shaft, one of said means for closing said first and second ends being integrally formed with said shell, wherein screws are inserted through the shell to secure the stator, the assembly means further including an electrically non-conductive overcap system for preventing electrical contact with said screws.

2. The improvement of claim 1 wherein the overcap includes a base section which fits under the heat of the screw and a cap section which fits over the head of the screw and interlocks with the base section, said base section having a generally flat inner portion fitting under the screw, an elevated outer, marginal portion with which the cap section interlocks, and an intermediate, translational portion sloping upwardly from the inner to the outer portions.

3. The improvement of claim 1 wherein the assembly means includes a pin inserted into the stator through an opening in the shell, the pin being inserted to a depth sufficient to prevent electrical contact between the pin and external objects.

4. A dynamoelectric machine comprising:
- a stator assembly including a core having an axial opening in it defining a bore;
- a rotor assembly mounted in said bore, said rotor assembly including a shaft, and a rotor mounted to said shaft, said shaft being mounted for rotation;
- a shell constructed from electrically non-conductive material, said shell defining a cavity for reception of said stator assembly and said rotor assembly, said shell having a first end and a second end;
- means for rotatably supporting said shaft along said first and second ends of said shell, said support means being constructed from electrically non-conductive material; and
- means for attaching said stator assembly in said shell, including means for electrically insulating said attaching means, said attaching means comprising a threaded fastener, and said means for insulating said attaching means comprising a protective overcap system which includes a base section fitting under the head of the screw and an overcap section fitting about the heat of said screw and interlocking with said base section, said base section having a generally flat inner portion fitting under the screw, an elevated outer marginal portion with which the cap section interlocks and an intermediate transitional portion sloping upwardly from the inner to the outer portions, and the overcap section having an uninterrupted outer cover surface and an inwardly turned circumferential flange fitting under the outer portion of the base section.

5. The dynamoelectric machine of claim 4 wherein said attaching means comprises a pin inserted into the stator core, said means for insulating said pin comprises a non-electrically conductive gap.

* * * * *